(12) United States Patent
Desai

(10) Patent No.: US 9,810,169 B2
(45) Date of Patent: *Nov. 7, 2017

(54) METHOD AND APPARATUS FOR CONTROLLING THE STARTING OF A FORCED INDUCTION INTERNAL COMBUSTION ENGINE

(71) Applicant: Perkins Engines Company Limited, Cambridgeshire (GB)

(72) Inventor: Paresh Rameshchandra Desai, Cambridgeshire (GB)

(73) Assignee: Perkins Engines Company Limited, Peterborough (GB)

( * ) Notice: Subject to any disclaimer, the term of this patent is extended or adjusted under 35 U.S.C. 154(b) by 275 days.

This patent is subject to a terminal disclaimer.

(21) Appl. No.: 14/397,438

(22) PCT Filed: May 21, 2013

(86) PCT No.: PCT/GB2013/051327
§ 371 (c)(1),
(2) Date: Oct. 27, 2014

(87) PCT Pub. No.: WO2013/175199
PCT Pub. Date: Nov. 28, 2013

(65) Prior Publication Data
US 2015/0083092 A1    Mar. 26, 2015

(30) Foreign Application Priority Data
May 21, 2012 (GB) .................................. 1208893.6

(51) Int. Cl.
*F02B 47/08* (2006.01)
*F02G 5/00* (2006.01)
(Continued)

(52) U.S. Cl.
CPC ............ *F02D 41/064* (2013.01); *F02B 33/40* (2013.01); *F02B 39/10* (2013.01); *F02B 47/08* (2013.01);
(Continued)

(58) Field of Classification Search
CPC ........ F01P 3/12; F01P 7/16; F01P 3/20; F02D 23/00; F02D 43/00; F02D 29/02;
(Continued)

(56) References Cited

U.S. PATENT DOCUMENTS 3,048,005 A    8/1962    Egli et al.
5,704,323 A    1/1998    Gardell et al.
(Continued)

FOREIGN PATENT DOCUMENTS

CN    101363348    2/2009
DE    10306586 A1    9/2003
(Continued)

OTHER PUBLICATIONS

European Patent Office, International Search Report in International Patent Application No. PCT/GB2013/051327, dated Dec. 18, 2013, 2 pp.

(Continued)

*Primary Examiner* — Syed O Hasan

(57) ABSTRACT

Starting an internal combustion engine may be difficult as a consequence of the operating conditions of the engine. Even after the engine has started, it may take a long period of time for the engine to reach operating temperatures. In the present disclosure, when engine start difficulty is expected, before starting the engine a forced induction compressor arranged with the engine may be turned on to increase the engine intake air pressure before the engine is started.

9 Claims, 5 Drawing Sheets

(51) Int. Cl.
  *F02D 41/06* (2006.01)
  *F02B 39/10* (2006.01)
  *F02N 19/00* (2010.01)
  *F02D 41/00* (2006.01)
  *F02B 33/40* (2006.01)
  *F02B 37/11* (2006.01)
  *F02D 23/00* (2006.01)

(52) U.S. Cl.
  CPC ....... *F02D 41/005* (2013.01); *F02D 41/0007* (2013.01); *F02D 41/062* (2013.01); *F02N 19/00* (2013.01); *F02B 37/11* (2013.01); *F02D 23/00* (2013.01); *F02D 41/0055* (2013.01); *F02D 2700/0246* (2013.01); *F02D 2700/0279* (2013.01); *F02N 2200/023* (2013.01); *F02N 2200/121* (2013.01); *F02N 2200/122* (2013.01); *Y02T 10/144* (2013.01)

(58) Field of Classification Search
  CPC .......... F02D 41/06; F02B 39/10; F02B 33/44; F02B 37/18
  USPC ..... 123/556, 217, 406.45, 406.48, 676, 698, 123/568.11
  See application file for complete search history.

(56) References Cited

U.S. PATENT DOCUMENTS

| | | | |
|---|---|---|---|
| 5,845,492 A | 12/1998 | Isobe et al. | |
| 6,260,545 B1 | 7/2001 | Suzuki | |
| 7,360,361 B2 | 4/2008 | Prusinski et al. | |
| 7,426,922 B2 | 9/2008 | Shimo et al. | |
| 7,725,238 B2 | 5/2010 | Perkins | |
| 7,765,793 B2 | 8/2010 | Nishiyama et al. | |
| 2004/0206083 A1 | 10/2004 | Okuyama et al. | |
| 2006/0053788 A1* | 3/2006 | Furman | B60K 6/24 60/608 |
| 2008/0243358 A1 | 10/2008 | Kojima et al. | |
| 2009/0277705 A1 | 11/2009 | Ichikawa | |
| 2010/0300414 A1 | 12/2010 | Pursifull et al. | |
| 2011/0022289 A1* | 1/2011 | Hofbauer | F02B 37/10 701/103 |

FOREIGN PATENT DOCUMENTS

| | | |
|---|---|---|
| JP | 04-342828 A | 11/1992 |
| JP | 2003307134 | 10/2003 |
| JP | 2003-328801 A | 11/2003 |
| JP | 2004-183578 A | 7/2004 |
| JP | 2008-095669 A | 4/2008 |
| JP | 2008-255940 A | 10/2008 |
| JP | 2008255940 | * 10/2008 |
| JP | 2010-138717 A | 6/2010 |
| JP | 2010-180711 A | 8/2010 |
| JP | 2010180711 | * 8/2010 |
| WO | WO 2006/056393 A1 | 6/2006 |

OTHER PUBLICATIONS

United Kingdom Intellectual Property Office, Search Report in United Kingdom Patent Application No. GB1208893.6, dated Aug. 21, 2012, 2 pp.

* cited by examiner

METHOD AND APPARATUS FOR CONTROLLING THE STARTING OF A FORCED INDUCTION INTERNAL COMBUSTION ENGINE

TECHNICAL FIELD

This disclosure relates to methods and apparatuses for controlling the starting of a forced induction internal combustion engine.

BACKGROUND

Starting an internal combustion engine in low ambient air temperatures, for example below 0° C., is often difficult without the use of starting aids, such as glow plugs. When cold air is drawn into the cylinder of a cold engine, piston velocity needs to be high in order to raise the temperature at top dead centre of the piston cycle and help the fuel in the cylinder to ignite. This is particularly true for diesel engines. However, the piston velocity when starting the engine is dependent on the starter motor alone, which is in turn powered by batteries. Consequently, the starter motor often does not produce a high enough piston velocity to start the engine and the battery may be drained before the engine is able to fire.

Thus, in low ambient air temperatures it is sometimes not possible to start an internal combustion engine, and even when the engine will start, it may take a considerable amount of time to warm up the engine to operating temperatures.

Similar problems may occur at high altitude where the concentration of oxygen in the air is lower than at sea level, and where the ambient air temperature is also low the problems may be even more severe.

The problem may be even more exacerbated if there are any parasitic loads on the engine. For example, if a diesel engine is fitted in a machine, such as a construction or agricultural type machine, the machine may make use of an implement or boom that uses hydraulics to function. Hydraulics require a hydraulic pump to be running, which adds a parasitic load on the engine as the engine starts.

U.S. Pat. No. 7,360,361 describes an engine arrangement in which an electrically assisted turbocharger is fitted to the engine. Soon after a cold start, or other low idle conditions, the electric induction motor of the electrically assisted turbocharger is turned on by a controller if the exhaust gas output from the engine is insufficient to cause the turbocharger to supply adequate amounts of fresh air to the air intake manifold of the engine. As the engine increases its speed and produces more exhaust gas to drive the turbocharger, the controller responsively reduces power to the induction motor.

After turning on the induction motor of the electrically assisted turbocharger, it may take some time for the intake manifold air pressure to increase to a level at which combustion within the cylinders is made easier. Therefore, at least the first few combustion cycles after starting the engine will not experience any improvement in the ease of combustion. Consequently, whilst the arrangement suggested in U.S. Pat. No. 7,360,361 might help to bring the engine speed up more quickly, it does not assist in the actual starting of the engine.

SUMMARY

The disclosure provides: a method for starting a forced induction internal combustion engine which has a compressor assist device, the method comprising the steps of: when engine start is demanded, determining from one or more measured parameter whether engine start difficulty is expected; if engine start difficulty is expected, turning on the compressor assist device to drive a forced induction compressor, thereby increasing the engine intake air pressure before starting the engine; starting the engine; and returning the compressor assist device to normal operation when the engine exceeds a first performance threshold, or when the compressor assist device has been on for a period of time exceeding a first period of time, wherein the first period of time is determined from the one or more measured parameter.

The disclosure also provides: a controller to control the starting of a forced induction internal combustion engine which has a compressor assist device, the controller being configured to: when engine start is demanded, determine from one or more measured parameter whether engine start difficulty is expected; if engine start difficulty is expected, turn on the compressor assist device to drive a forced induction compressor, thereby increasing the engine intake air pressure before starting the engine; start the engine; and return the compressor assist device to normal operation when the engine exceeds a first performance threshold, or when the compressor assist device has been on for a period of time exceeding a first period of time, wherein the first period of time is determined from the one or more measured parameter.

DETAILED DESCRIPTION

In a standard turbocharger arrangement, a compressor in the turbocharger may operate to increase the pressure of the air entering the air intake manifold of an engine above atmospheric pressure by an amount often described as 'boost pressure'. The turbine and compressor may be attached to different ends of a turbocharger shaft, such that when exhaust gas passes through the turbine, the shaft may be turned, which may turn the compressor which increases the pressure of the air entering the air intake manifold of the engine.

Turbochargers with an electro turbo assist (ETA) device operate on the same principles as standard turbochargers, but are modified to include the ETA which may have an energy storage device, for example a fly wheel or battery and which may be coupled to the turbocharger shaft.

When the shaft is turning, energy may be input to the energy storage device. When the shaft is not turning, or is turning too slowly to achieve the desired air intake pressure, energy may be output from the energy storage device and used to turn the shaft in order to turn the compressor. For example, if the energy storage device is a battery, the ETA generator/motor may comprise coiled windings around the shaft. When the shaft rotates, the electromagnetic forces created in the windings may generate electricity to be stored in the battery. When the shaft is not being turned by the turbine (for example when the engine is not turned on), or when the shaft is being turned too slowly, electrical energy may be supplied from the battery to the windings so that the windings may act as a motor and turn the shaft.

Figure 1:
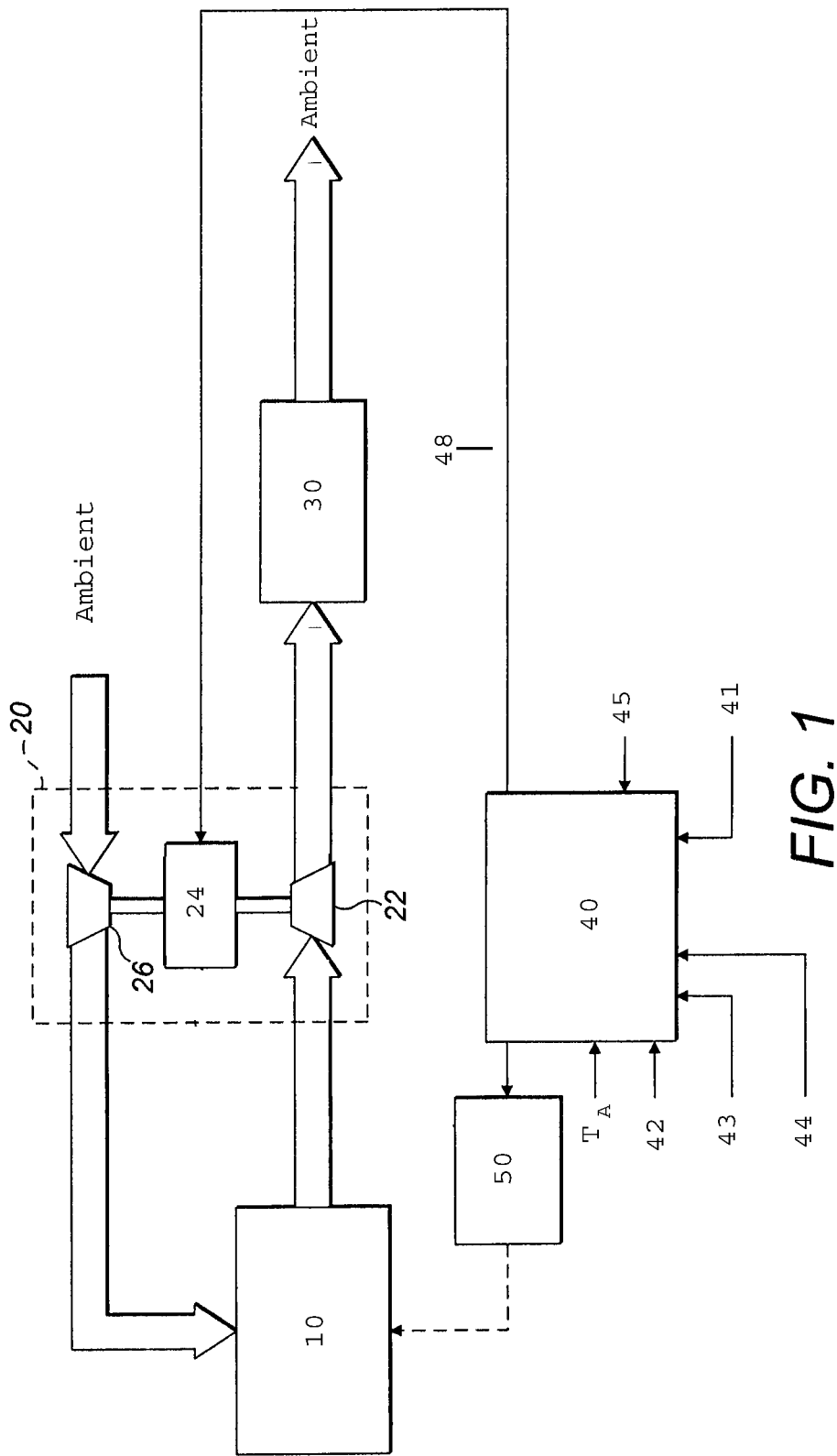
FIG. 1 shows a schematic drawing of a turbocharged internal combustion engine unit with an electrically assisted turbocharger.

FIG. 1 shows an arrangement of a turbocharged internal combustion engine 10, which could be a diesel engine or a petrol/gasoline engine. The turbocharger 20 in the arrangement shown in FIG. 1 has an electro turbo assist (ETA) device 24.

The turbocharger turbine 22 intake of the turbocharger 20 is located downstream of the exhaust manifold of the engine 10 such that when the engine 10 is running, exhaust gases will pass through the turbocharger turbine 22 of the turbocharger 20. The turbocharger compressor 26 intake of the turbocharger 20 is located upstream of the engine 10 air intake manifold such that intake air is compressed before it enters the intake manifold of the engine 10.

Downstream of the turbocharger turbine 22, when the engine 10 is running the exhaust gases may pass to downstream components 30, for example a particulate filter, as shown in FIG. 1. Alternatively, the exhaust gases may be vented directly to the atmosphere.

Air drawn into the intake of the turbocharger compressor 26 may come directly from the atmosphere, as shown in FIG. 1, or via an exhaust gas recirculation path, or a combination of the two. Exhaust gas recirculated to the turbocharger compressor 26 intake whilst the engine 10 is running may be drawn from a point upstream of the turbocharger turbine 22, a point downstream of the turbocharger turbine 22 but upstream of the downstream components 30, a point downstream of the downstream components 30, or some combination of the three.

Control of the ETA device 24 operation is performed by a controller 40.

Figure 2:
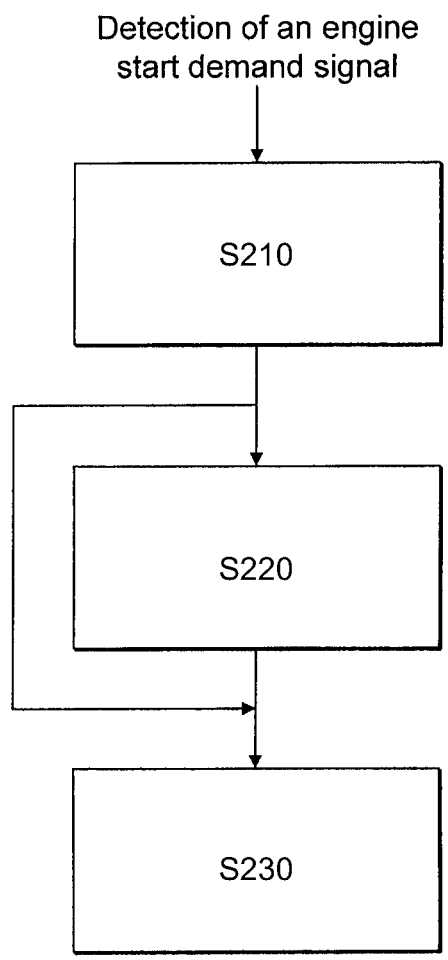
FIG. 2 shows method steps for starting an engine arrangement of the type shown in FIG. 1.

FIG. 2 shows a flow diagram of a method of controlling the starting of the engine 10 in accordance with a mode of the present disclosure.

The method of starting the engine 10 is triggered by an engine start demand signal 45. The engine start demand signal 45 may be triggered, for example, by the turning of a key in the ignition of a vehicle by an operator, the pressing of a starter button by the operator, or by some other means which will be immediately apparent to the skilled person.

Upon detection of an engine start demand signal 45, the controller 40 will initiate the engine start control method shown in FIG. 2. The first step S210 of the method is to consider if a measured parameter(s) indicates that engine start difficulty is to be expected.

The measured parameter(s) may include, but is not limited to, at least one of ambient air temperature $T_A$, engine coolant temperature 41, altitude 42, and fuel temperature 44.

The above mentioned parameter(s) may be determined by direct or indirect measurement techniques. For example, a measurement of altitude 42 may be obtained directly using an altimeter, or some other suitable direct measurement device, or may be derived from other sensor measurements, using for example mathematical models.

Likewise, there are many different ways in which a measure of the ambient air temperature $T_A$, the engine coolant temperature 41 and the fuel temperature 44 may be obtained. For example, one technique for obtaining a measure of ambient air temperature $T_A$ is to take a direct measurement of the air temperature using a temperature sensor. The temperature sensor may be located anywhere on or near the engine 10 where ambient or near ambient air is present, for example at the air intake manifold of the engine, or at some other suitable location either within, or on the exterior of, the engine 10. In addition to, or as an alternative to, a direct measurement of the ambient air temperature $T_A$, an indirect measurement may be taken. Indirect measurements of ambient air temperature $T_A$ might include, but are not limited to, a direct measurement of the engine coolant temperature 41 or fuel temperature 44, from which an approximation of ambient air temperature $T_A$ may be derived. The engine coolant temperature 41 and fuel temperature 44 may be obtained in analogous direct or indirect ways, which will be immediately apparent to the skilled person.

The measured parameter(s) may be used as an input to a control map or table which determines which method step in starting the engine 10 should be undertaken next.

As shown in FIG. 2, if the measured parameter(s) is such that, according to the control map, engine start difficulties are expected, the engine start method will proceed to step S220. If, on the other hand, the measured parameter(s) is such that, according to the control map, engine start difficulties are not to be expected, the engine start method will proceed directly to step S230.

For example, the control map may compare the ambient air temperature $T_A$ to a threshold temperature $T_{TH}$. If the ambient air temperature $T_A$ is greater than the threshold temperature $T_{TH}$, the engine should start normally without any problems and, therefore, the method may proceed directly to Step S230. If, however, the ambient air temperature $T_A$ is less than the predetermined threshold temperature $T_{TH}$, engine start difficulties should be expected and the method may proceed instead to Step S220.

The threshold temperature $T_{TH}$ may be a predetermined, fixed value, for example 0° C. or 5° C., or it may be dependent upon one or many of the other measured parameters. For example, at higher altitudes, the threshold temperature $T_{TH}$ may be lowered.

In addition to one or many of the measured parameter inputs, the control map/table may also consider a number of other factors including, but not limited to, at least one of, parasitic loads on the engine, engine size and engine fuel type.

In Step S220, the ETA device 24 is turned on in order to rotate the turbocharger compressor 26 of the turbocharger 20. By rotating the turbocharger compressor 26 to a speed which allows a calibrated flow of air into the air intake manifold of the engine 10, the air pressure in the air intake manifold may be increased.

When the ETA device 24 has been on for a sufficient period of time to increase the air pressure in the air intake manifold to a sufficient level above the ambient air pressure, (for example at sea level, an air pressure of 1.2 bar in the air intake manifold may be considered to be sufficient, which might take up to approximately 10 seconds to achieve after turning on the ETA device 24), the engine 10 may be started (Step S230) by, for example, turning on the starter motor 50, or by any other means which will be known to the person skilled in the art. In any event, the engine 10 may be started after a predetermined extended period of time, even if the air pressure in the air intake manifold has not reached a sufficient level, for self-protection of the arrangement. The predetermined extended period of time may be dependent upon the physical arrangement of the engine and/or the measured parameters, such as at least one of ambient air temperature $T_A$, engine coolant temperature 41, altitude 42, and fuel temperature 44. For example, at lower ambient air temperatures $T_A$ and/or higher altitudes 42, it may be expected that it will take longer for the air pressure in the air intake manifold to reach a sufficient level. Therefore, the predetermined extended period of time may be set to a longer period of time. In this way, closed loop feedback using the measured parameters may be introduced to the system rather than using a fixed, finite extended period of time.

After starting the engine 10, the ETA device 24 will stop driving the turbo shaft and switch to normal operation when the engine 10 is considered to be operating within an acceptable operating range by exceeding a performance threshold. For example, the temperature of the engine 10 may be considered acceptable when the engine temperature exceeds a performance threshold value, for example 40° C. or 45° C., or the engine speed may be considered acceptable when it exceeds a performance threshold value, for example 300 rev/min. In any event, the engine 10 will be returned to normal operating conditions upon expiry of the predetermined extended period of time (which is explained above), even if the engine temperature or speed have not reached the threshold values, for self-protection of the arrangement. The predetermined extended period of time is set dependent upon the measured parameters, such that the extended period of time may be set longer for measured parameters where it might be expected to take longer for the engine 10 to reach an acceptable operating range, for example at lower ambient air temperatures $T_A$ and/or higher altitudes 42. In this way, closed loop feedback may be introduced so that ETA device 24 may be given a longer opportunity to have an effect when the engine 10 is in difficult operating environments.

The engine temperature may be measured using one of the many direct or indirect measurement techniques which will be well known to the skilled person. For example, the engine coolant temperature 41 may be considered to give a measurement of the engine temperature.

Figure 3:
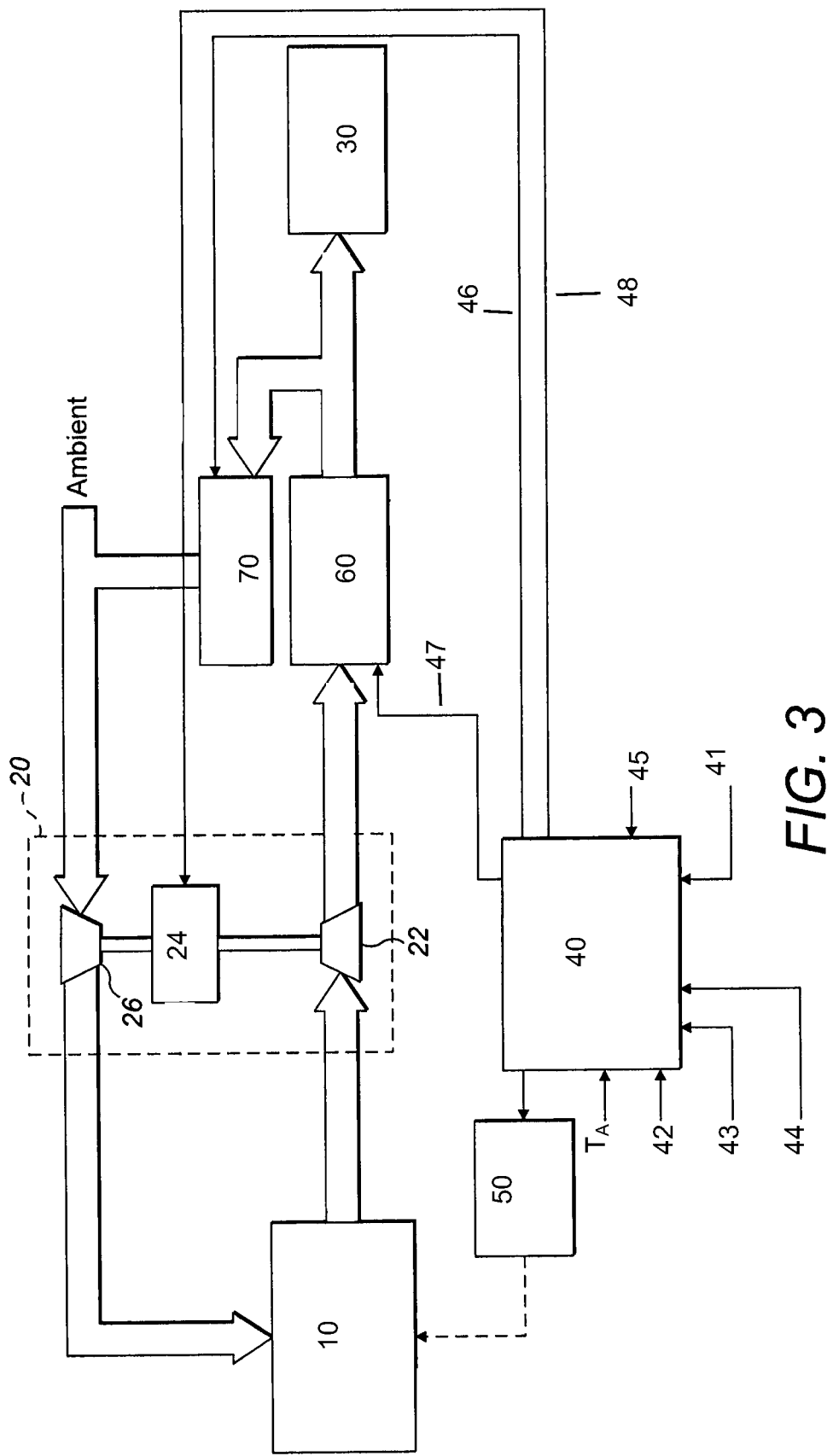
FIG. 3 shows a schematic drawing of a turbocharged internal combustion engine with an electrically assisted turbocharger, a particulate filter and an exhaust gas recirculation path.

FIG. 3 shows a modification of the engine arrangement shown in FIG. 1. An exhaust gas aftertreatment device 60, for example a particulate filter 60, may be located upstream of the turbocharger turbine 22, or downstream of the turbocharger turbine 22 as shown in FIG. 3. The particulate filter 60 might include, but is not limited to, at least one of a diesel oxidation catalyst, a diesel particular filter or a selective catalytic reduction (SCR) system. The choice of particulate filter may depend upon, for example, which exhaust gas emissions are desired to be reduced before the exhaust gas is released into the atmosphere and/or the engine 10 type.

The exhaust gases downstream of the particulate filter 60 may continue through the exhaust gas path to downstream components 30, for example further particulate filters, or be vented directly to the atmosphere, or be at least in part recirculated via an exhaust gas recirculation path into the air intake manifold of the engine 10. Exhaust gases might be recirculated directly to the air intake manifold of the engine 10 or via the turbocharger compressor 26, as shown in FIG. 3, or a combination of the two. A recirculation valve 70 may be located in the recirculation path and when it is open, the recirculation path may be open to allow exhaust gases to be recirculated. When the recirculation valve 70 is closed, the recirculation path may be closed and exhaust gases may not be recirculated.

Figure 4:
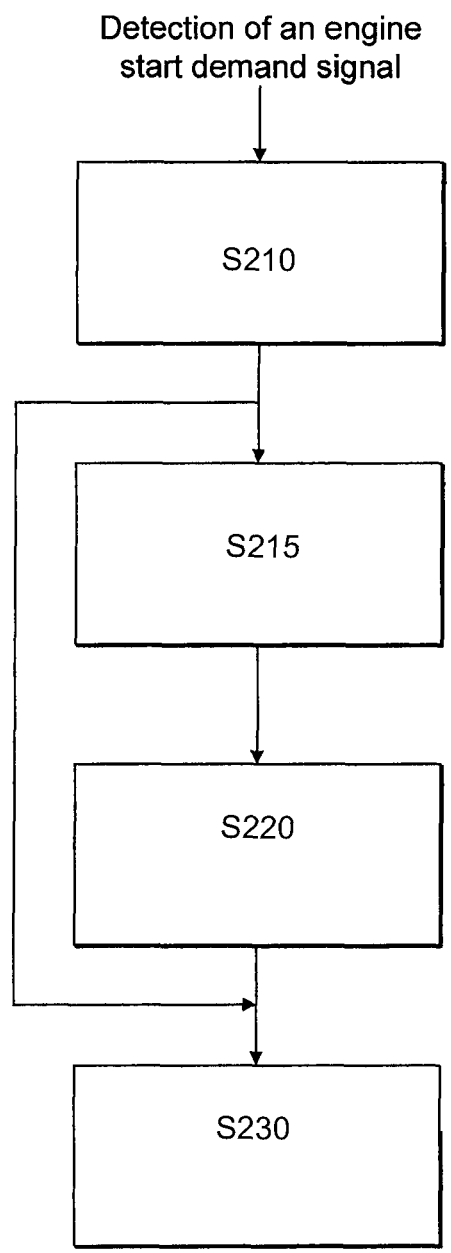
FIG. 4 shows method steps for starting an engine arrangement of the type shown in FIG. 3.

FIG. 4 shows the steps of a method of controlling the starting of the engine arrangement shown in FIG. 3. The method steps shown in FIG. 4 are similar to those shown in FIG. 2, and vary only in the provision of an additional step, S215.

When the measured parameters are such that it is determined that there may be engine 10 starting difficulties, before turning on the ETA device 24 in S220, particulate filter 60 heating may be turned on and the recirculation valve 70 may be opened (Step S215). The recirculation valve 70 may be opened before, at the same time as or after the particulate filter 60 heating is turned on.

By heating the particulate filter 60 and opening the recirculation valve 70 before turning on the turbocharger compressor 26, residual air in the particulate filter 60, the exhaust gas path and exhaust gas recirculation path may be warmed. When the turbocharger compressor 26 is turned on, the warmed residual air may then be compressed by the turbocharger compressor 26 and drawn into the air intake manifold of the engine 10. Consequently, the air at the intake manifold of the engine 10 when the engine 10 is subsequently turned on (Step S230) may be warmer than when the turbocharger compressor 26 draws only ambient air into the air intake manifold of the engine 10.

Alternatively, the particulate filter 60 may be heated and the recirculation valve 70 opened after the ETA device 24 is turned on in Step S220 and before the engine is turned on in Step S230.

By heating the particulate filter 60, opening the recirculation valve 70 and turning on the ETA device 24, in any order, before turning on the engine 10, the temperature and pressure of the air in the air intake manifold of the engine 10 may be increased before turning on the engine 10.

Furthermore, by heating the particulate filter 60 before starting the engine 10, the temperature of all exhaust gases recirculated to the engine air intake may be increased, from the moment the engine 10 is turned on. This may result in an increase in the temperature of the air being drawn into the engine 10 and consequently an increase in the engine temperature.

The particulate filter 60 may be heated by a number of different methods, which may include, but are not limited to, electric heating and combustion heating.

Electric heating may be performed when electric wires are arranged within and/or around the particulate filter 60. For example, thin conducting wires may be embedded within the honeycomb structure of a catalyst in the particulate filter 60, and when electric current is passed through the wires, the catalyst may be heated.

Combustion heating may be performed by injecting fuel directly into the filter 60, and igniting it with a spark plug. Alternatively, fuel may be injected into the exhaust stream at a point upstream of the filter 60 and be ignited by a spark plug either within or upstream of the filter 60. Furthermore, if filter 60 heating is still required after starting the engine 10, unburned engine fuel may enter the exhaust gas stream directly from the engine exhaust as a consequence of running a rich fuel-air ratio in the engine 10, and be ignited by a spark plug either within or upstream of the filter 60.

The minimum temperature to which the particulate filter 60 should be heated might be determined by the physical arrangement of the components of the system relative to one another and/or at least one of the measured parameters. For example, at sea level and at an ambient air temperature $T_A$ of 5° C., the minimum target particulate filter temperature might be set to be somewhere between 350° C. and 500° C., such as 400° C.

Lower ambient air temperatures $T_A$ and/or lower engine coolant temperatures 41 and/or higher altitudes 42 may require the particulate filter 60 to be heated to a higher temperature. A map or table of target particulate filter temperature and ambient air temperature $T_A$ might, for example, be used for this purpose.

Having reached the minimum temperature, the particulate filter 60 should be held at that temperature until the residual air in the exhaust system has reached the desired temperature. The desired temperature may depend upon the physical arrangement of the engine assembly itself, as well as, for example, the ambient air temperature $T_A$ and altitude. The temperature of the residual air may be determined by either direct or indirect measurement, using techniques well known to the person skilled in the art. Alternatively, the residual air may be deemed to have reached the desired temperature after the particulate filter has been held above the target temperature for a period of time. The period of time may depend upon the physical arrangement of the engine assembly itself, as well as, for example, the ambient air temperature $T_A$ and altitude, or may be a fixed value, for example 100 seconds.

In any event, the engine may be started after a predetermined extended period of time, for example 600 seconds after starting the filter 60 heating, even if the filter 60 has not reached a reasonable temperature, or the residual air has not reached the desired temperature, for self-protection of the arrangement. The predetermined extended period of time may be dependent upon the physical arrangement of the engine, as well as the measured parameters, such as at least one of ambient air temperature $T_A$, engine coolant temperature 41, altitude 42, and fuel temperature 44. For example, at lower ambient air temperatures $T_A$ and/or higher altitudes 42, it may be expected that it will take longer for the filter 60 to reach a reasonable temperature. Therefore, the predetermined extended period of time may be set to a longer period of time for lower ambient air temperatures $T_A$ and/or higher altitudes 42. In this way, closed loop feedback using the measured parameters may be introduced to the system rather than using a fixed, finite extended period of time.

Where the particulate filter 60 is heated by conductive wires, the temperature to which the particulate filter 60 is heated may be controlled by passing an electric current through the wires for only a certain period of time. The period of time may be determined by the measured parameters. For example, a control map may determine the electric heating time from at least one of the measured parameters which are input to the map. In addition to this, or as an alternative, the temperature of the particulate filter 60 may be monitored, and heating of the filter 60 turned off once the filter 60 has reached the desired temperature.

Where the particulate filter 60 is heated by combustion of fuel, the temperature to which the particulate filter 60 is heated may be controlled by adjusting the volume of fuel injected into, or upstream of, the particulate filter 60, or when heating of the filter 60 is still desired after turning on the engine 10, by adjusting the amount of fuel injected into the engine 10, which will alter the amount of unburned fuel entering the exhaust gas stream from the engine exhaust gas manifold. For injection of fuel into, or upstream of, the filter 60, the fuel may be injected and then combusted in a single injection and combustion event, or may be injected in multiple smaller injection and combustion events. In the case of the latter, the temperature of the particulate filter 60 may be controlled by adjusting the number of injection and combustion events. Compared with a single, larger injection and combustion event, multiple injection and combustion events may decrease the chance that fuel will be left unburned or ignite downstream of the filter 60. The volume of fuel injected and/or the number of injection and combustion events may be determined by the measured parameters. For example, a control map may also determine the fuel injection volume and/or number of injection and combustion events from at least one of the measured parameters which are input to the map. In addition to this, or as an alternative, the temperature of the particulate filter 60 may be monitored, and combustion of the fuel within or upstream of the filter 60 ceased after the filter 60 has reached the desired temperature.

Some time after starting the engine 10, the recirculation valve 70 may be closed to prevent recirculation of warmed exhaust gases and particulate filter 60 heating turned off. The closing of the recirculation valve 70 and turning off of the particulate filter 60 heating may take place at a time when the engine 10 is considered to be operating within an acceptable operating range by exceeding a performance threshold. For example, the temperature of the engine 10 may be considered acceptable when the engine temperature exceeds a performance threshold value, for example 40° C. or 45° C., or the engine speed may be considered acceptable when it exceeds a performance threshold value, for example 300 rev/min. In any event, the engine may be returned to normal operating conditions upon expiry of the predetermined extended period of time (which is explained above), even if the engine temperature or speed have not reached the threshold values, for self-protection of the arrangement. If the predetermined extended period of time is set dependent upon the measured parameters, the extended period of time may be set longer for measured parameters where it might be expected to take longer for the engine 10 to reach an acceptable operating range, for example at lower ambient air temperatures $T_A$ and/or higher altitudes 42. In this way, closed loop feedback may be introduced so that particulate filter 60 heating may be given a longer opportunity to have an effect when the engine 10 is in difficult operating environments.

Turning off of the filter 60 heating and closing of the recirculation valve 70 may take place at the same time, or different times, and may be triggered by different engine temperature and/or speed thresholds.

FIG. 1 shows a controller 40 in accordance with an aspect of the present disclosure.

The controller 40 may have a number of inputs, including, but not exclusive to: the measured parameters, air temperature $T_A$, engine coolant temperature 41, altitude measurement 42, and fuel temperature 44; engine speed measurement 43; and the engine start demand signal 45. The controller may also have a number of outputs, including, but not exclusive to, the ETA control signal 48.

FIG. 3 shows a controller 40 in accordance with a further aspect of the present disclosure. The controller 40 shown in FIG. 3 is the same as that shown in FIG. 1, but includes further outputs: the recirculation valve control signal 46 and a filter heating signal 47.

The controller 40 is arranged to carry out the above described methods upon receipt of an engine start demand signal 45. The controller 40 may utilise an engine map or table, or some other suitable means, in order to determine whether or not the engine 10 should be directly started as normal, or if method steps should be taken to ease engine starting. The controller 40 may also utilise other engine maps or tables to determine the other threshold values described above in respect of the method steps for easing engine starting.

The controller 40 may be implemented in an engine control unit, for example the Caterpillar® A4:E4 or A5:E2, or as a separate, standalone control unit.

Figure 5:
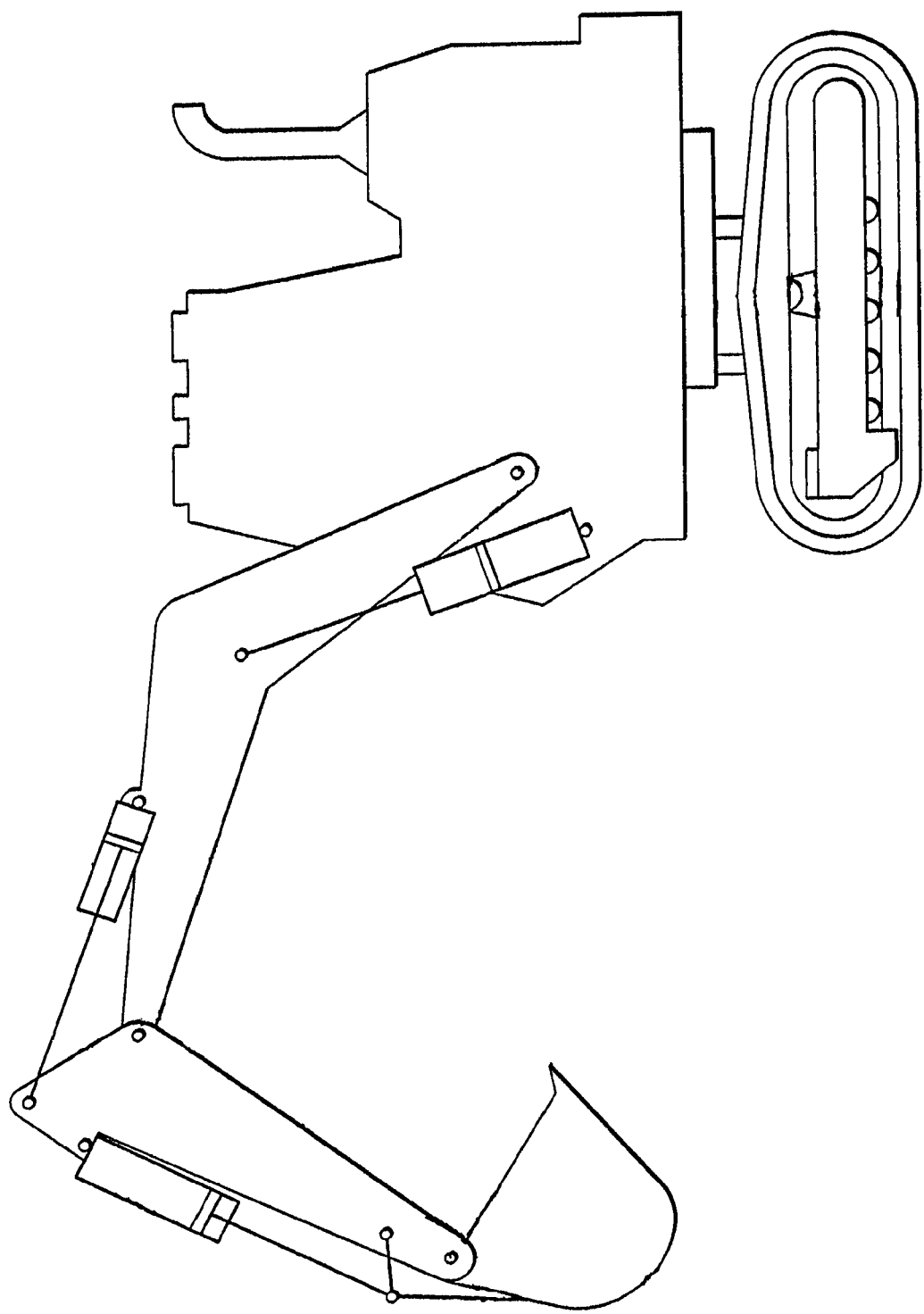
FIG. 5 shows an example vehicle within which the engine unit of FIG. 1 or 3 may be used.

FIG. 5 shows a vehicle within which the engine unit shown in FIG. 1, or the engine unit shown in FIG. 3, could be used.

The skilled person will appreciate that various alternatives to the aspects of the implementations described above may be used. For example, rather than using a turbocharged internal combustion engine with a turbocharger 20 with an ETA device 24, any other type of forced induction internal combustion engine, for example a supercharged international combustion engine, with a forced induction compressor arranged to increase the pressure of the air entering the air intake manifold of the engine, for example a supercharger, coupled to a compressor assist device (of which an ETA device is an example) that is arranged to drive the forced induction compressor, thereby compressing intake air, independently of engine operation could alternatively be used.

INDUSTRIAL APPLICABILITY

The present disclosure finds application in starting forced induction internal combustion engines, for example turbocharged internal combustion engines. In some conditions, for example at low ambient air temperatures and/or high altitudes, starting internal combustion engines may be difficult. In the present disclosure, turning on a compressor assist device, for example an ETA device, to drive a forced induction compressor, for example a turbocharger compressor, before starting the engine increases the engine intake air pressure, which makes starting the engine easier. The compressor assist device is returned to normal operation when the engine exceeds a first predetermined performance threshold, for example when the engine temperature exceeds a threshold temperature or the engine speed exceeds a threshold speed, or when the compressor assist device has been on for a period of time exceeding a first period of time. The first period of time is determined from the one or more measured parameter, which introduces closed loop control into the system and may allow a longer first period of time to be set for more difficult operating environments, for example lower ambient temperatures and/or higher altitudes, thereby giving the compressor assist device and forced induction compressor greater opportunity to help the engine reach the first predetermined performance threshold.

The invention claimed is:

1. A method for starting a forced induction internal combustion engine having a compressor assist device and an exhaust system, the exhaust system having an exhaust gas path, an exhaust gas aftertreatment device which is in the exhaust gas path, an exhaust gas recirculation path, and a recirculation valve in the exhaust gas recirculation path, such that, when the engine is turned on, exhaust gas may exit the engine into the exhaust gas path and at least part of the exhaust gas which has passed through the exhaust gas aftertreatment device may be recirculated to the engine air intake via the exhaust gas recirculation path, the method comprising the steps of:

when engine start is demanded, determining from at least one measured parameter whether engine start difficulty is expected;

if engine start difficulty is expected, turning on the compressor assist device to drive a forced induction compressor, thereby increasing the engine intake air pressure before starting the engine;

starting the engine;

returning the compressor assist device to normal operation when the engine exceeds a first performance threshold, and when the engine does not exceed the first performance threshold in a first period of time returning the compressor assist device to normal operation after a second extended period of time exceeding the first period of time, wherein the second extended period of time is determined from the at least one measured parameter;

if engine start difficulty is expected, heating the exhaust gas aftertreatment device before turning on the engine so that residual air within the exhaust system is warmed by the exhaust gas aftertreatment device;

opening the recirculation valve upon turning on the compressor assist device to allow warmed exhaust gases to recirculate to the engine air intake; and closing the recirculation valve to prevent warmed exhaust gases from recirculating to the engine air intake when the engine exceeds a second performance threshold, and when the engine does not exceed the second performance threshold in the second extended period of time closing the recirculation valve after the second extended period of time.

2. The method of claim 1, wherein the at least one measured parameter comprises at least one of ambient air temperature, engine altitude, engine coolant temperature and fuel temperature.

3. A controller to control the starting of a forced induction internal combustion engine having a compressor assist device and an exhaust system, the exhaust system having an exhaust gas path, an exhaust gas aftertreatment device which is in the exhaust gas path, an exhaust gas recirculation path, and a recirculation valve in the exhaust gas recirculation path, such that, when the engine is turned on, exhaust gas may exit the engine into the exhaust gas path and at least part of the exhaust gas which has passed through the exhaust gas aftertreatment device may be recirculated to the engine air intake via the exhaust gas recirculation path, the controller being configured to:

when engine start is demanded, determine from at least one measured parameter whether engine start difficulty is expected;

if engine start difficulty is expected, turn on the compressor assist device to drive a forced induction compressor, thereby increasing the engine intake air pressure before starting the engine;

start the engine;

return the compressor assist device to normal operation when the engine exceeds a first performance threshold, and when the engine does not exceed the first performance threshold in a first period of time return the compressor assist device to normal operation after a second extended period of time exceeding the first period of time, wherein the second extended period of time is determined from the at least one measured parameter;

if engine start difficulty is expected, turn on the heating of the exhaust gas aftertreatment device before turning on the engine so that residual air within the exhaust system is warmed by the exhaust gas aftertreatment device;

open the recirculation valve upon turning on the compressor assist device to allow warmed exhaust gases to recirculate to the engine air intake; and close the recirculation valve to prevent warmed exhaust gases from recirculating to the engine air intake when the engine exceeds a second performance threshold, and when the engine does not exceed the second performance threshold in the second extended period of time closing the recirculation valve after the second extended period of time.

4. The controller of claim 3, wherein the at least one measured parameter comprises at least one of ambient air temperature, engine altitude, engine coolant temperature and fuel temperature.

5. The controller of claim 3, wherein the controller is part of an Engine Control Unit, or is a separate control unit.

6. A forced induction internal combustion engine comprising the controller defined in claim 3.

7. A vehicle comprising the forced induction internal combustion engine defined in claim 6.

8. A method for starting a forced induction internal combustion engine having a compressor assist device and an exhaust system, the exhaust system having an exhaust gas path, an exhaust gas aftertreatment device which is in the exhaust gas path, an exhaust gas recirculation path, and a recirculation valve in the exhaust gas recirculation path, such that, when the engine is turned on, exhaust gas may exit the engine into the exhaust gas path and at least part of the exhaust gas which has passed through the exhaust gas aftertreatment device may be recirculated to the engine air intake via the exhaust gas recirculation path, the method comprising the steps of:

when engine start is demanded, determining from at least one measured parameter whether engine start difficulty is expected;

if engine start difficulty is expected, turning on the compressor assist device to drive a forced induction compressor, thereby increasing the engine intake air pressure before starting the engine;

starting the engine;

returning the compressor assist device to normal operation when the engine exceeds a first performance threshold, and when the engine does not exceed the first performance threshold in a first period of time returning the compressor assist device to normal operation after a second extended period of time exceeding the first period of time, wherein the second extended period of time is determined from the at least one measured parameter;

if engine start difficulty is expected, heating the exhaust gas aftertreatment device before turning on the engine so that residual air within the exhaust system is warmed by the exhaust gas aftertreatment device, wherein the warmed residual air is recirculated to a point upstream of the forced induction compressor such that the warmed residual air is compressed by the forced induction compressor before entering the engine air intake;

opening the recirculation valve upon turning on the compressor assist device to allow warmed exhaust gases to recirculate to the engine air intake; and closing the recirculation valve to prevent warmed exhaust gases from recirculating to the engine air intake when the engine exceeds a second performance threshold, and when the engine does not reach the performance threshold in the second extended period of time closing the recirculation valve after the second extended period of time.

9. The method of claim 8, wherein the at least one measured parameter comprises at least one of ambient air temperature, engine altitude, engine coolant temperature and fuel temperature.

* * * * *